No. 829,375. PATENTED AUG. 21, 1906.
W. E. GARVEY.
AIR CARBURETER.
APPLICATION FILED MAY 18, 1906.
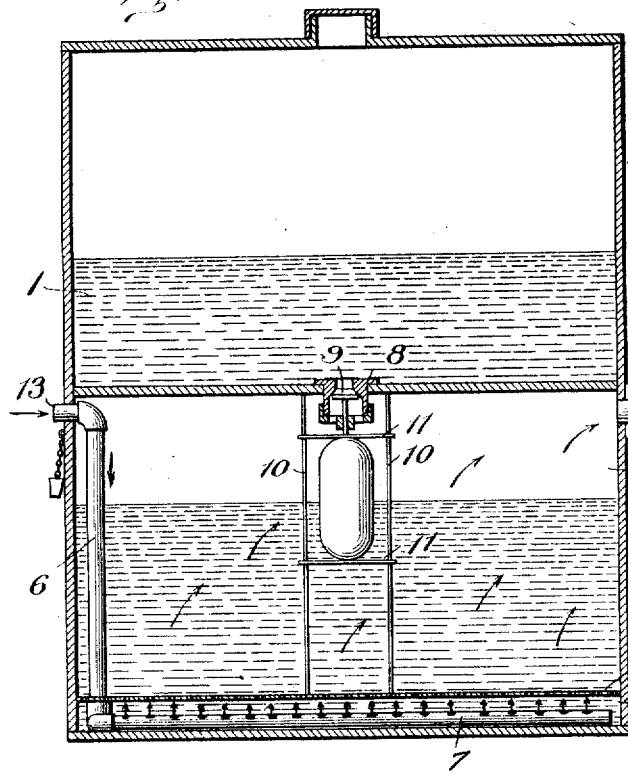
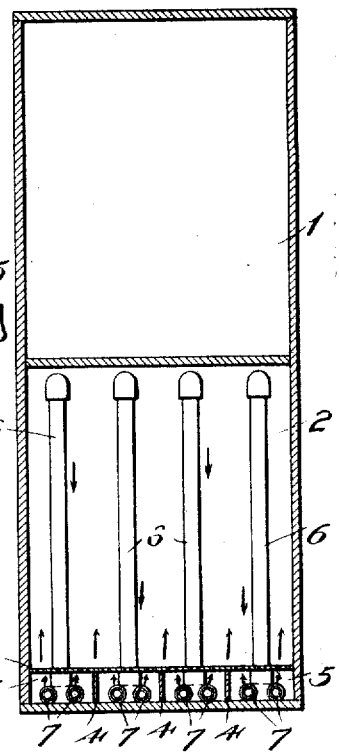
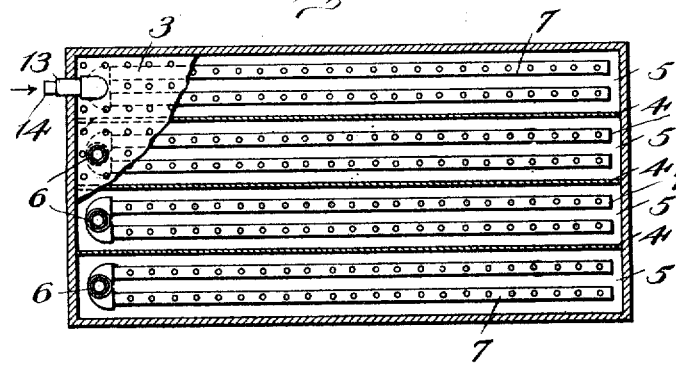
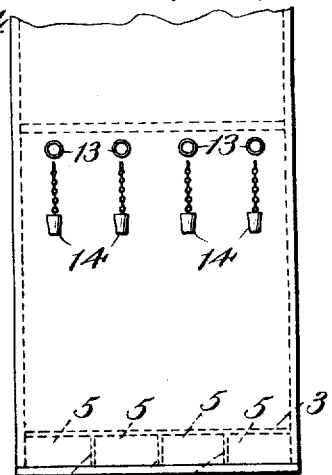
Witnesses
Edwin L Bradford
Anne B Johnson
Inventor
William E. Garvey
By Johnson & Johnson
Attorneys

UNITED STATES PATENT OFFICE.

WILLIAM E. GARVEY, OF CLEVELAND, OHIO, ASSIGNOR OF ONE-THIRD TO ALBERT N. BUTLER AND ONE-THIRD TO WENDALL J. ENGEL, OF CLEVELAND, OHIO.

AIR-CARBURETER.

No. 829,375.  
Specification of Letters Patent.  
Patented Aug. 21, 1906.

Application filed May 18, 1906. Serial No. 317,484.

*To all whom it may concern:*

Be it known that I, WILLIAM E. GARVEY, a citizen of the United States, residing at Cleveland, in the county of Cuyahoga and State of Ohio, have invented certain new and useful Improvements in Air-Carbureters; and I do hereby declare the following to be a full, clear, and exact description of the invention, such as will enable others skilled in the art to which it appertains to make and use the same.

For charging air with an inflammable gas I have produced an improved air-carbureter in which the air is drawn by suction through a body of hydrocarbon liquid and saturated with the fluid to render it combustible for use as a motive power, and in the claims appended hereto and in connection with the accompanying drawings I will point out wherein my invention resides.

Referring to the drawings, Figure 1 shows in vertical longitudinal section a tank air-carbureter embodying my improvement. Fig. 2 is a horizontal section, the greater portion of the bottom perforated plate being broken away and showing the base of the tank divided into longitudinal compartments and perforated pipes extending the length of each compartment for delivering air therein. Fig. 3 is a transverse section of the same looking toward the air-inlet pipes. Fig. 4 is an end view showing the air-inlets and means for closing them.

A metal tank is divided by a partition into an upper chamber 1 for containing and supplying liquid hydrocarbon and a lower chamber 2 for containing the gasifying liquid for charging the air. A perforated plate 3 forms a bottom space about an inch in depth, and this space is divided by partitions 4 into a plurality of longitudinal compartments 5, each of which is covered by the perforated plate. A pipe 6, which opens at the end wall of the tank at or near the top of the gas-chamber, passes through the perforated plate into each of the compartments and extends therein in a perforated branch 7, which terminates in a closed end at the opposite wall of the tank. A short tube 8 in the tank-dividing partition connects the supply-chamber with the gas-chamber, and the feed of the liquid through said tube is controlled by a float-actuated valve 9, which determines the level of the liquid above the perforated plate and which may be two or three inches, the valve for this purpose being caused to be opened and closed by the rise and fall of the liquid above the perforated plate. Any suitable float may be used; but I prefer to mount it in vertical guides 10, between which it is caused to have a vertical movement on cross-guides 11, slidable on the vertical guide-rods, so that the float will be in central alinement with the valve-stem to operate it, as stated. A pipe 12 enters the wall of the gas-chamber at the top thereof and opposite the air-inlets and may lead to the cylinder of an explosive-engine, the suction of the gas therein being created by strokes of the piston. In this suction the air is drawn into the inlet of each pipe at its opening at the tank-wall, down and into the perforated pipe in each compartment beneath the perforated plate. These pipes will be filled with the liquid hydrocarbon to the level with the liquid in the gas-chamber, and the air will be drawn through this liquid and out through the perforations of the pipes into and through the liquid in each compartment, thence up through the perforations in the covering-plate of the compartments, and through the liquid above the perforated plate into the gas-chamber. The advantage of a separate compartment for each air-inlet pipe is that the air is distributed uniformly into the liquid in each compartment, so that the flow of the air is slightly retarded within the perforated pipes and within each compartment and is thereby caused to be thoroughly charged with the vapor of hydrocarbon before it enters the gas-chamber.

The air-inlets 13, opening in the wall, give the important advantage of having a plurality of imperforated air-conductors and perforated pipes arranged in a group and of controlling the volume of air to be gasified by shutting off one or more of the inlet-openings and necessarily a corresponding number of compartments to render the gas more or less rich, as may be found necessary in its use, and for this purpose each air-inlet is provided with a suitable cut-off, which may be a chained stopper 14. In this particular the wall-controlled air-inlets are also advantageous in affording the convenience for closing all the air-conduits when the device is not in use, and thus prevent the evaporation of the hydrocarbon and the production of gas.

For this purpose the delivery-pipe may be provided with a suitable cock 15 to close it when the wall-openings are closed.

While a single perforated pipe in a compartment may supply the required volume of air to a certain quantity of liquid, yet I prefer to use a pair of perforated pipes in a compartment and to connect each pair as branch pipes to the end of an air-inlet pipe to increase the quantity of air delivered in each compartment. Obviously the device may be used with a forced air-feed instead of suction; but I prefer the suction air-feed, because a forced air-feed would require an air-pump and means for connecting it with the wall-openings. In either feed the air is caused to pass in currents some distance through the body of the hydrocarbon within the perforated pipes and to pass therefrom into the hydrocarbon in the compartment and from thence into the body of the hydrocarbon in the air-charged chamber.

I claim—

1. An air-carbureter, comprising a tank divided into an upper chamber for containing a hydrocarbon liquid and a lower chamber for containing the charged air, a perforated plate forming a bottom space, partitions whereby said space is formed into a plurality of longitudinal compartments of which said perforated plate forms a cover, air-inlet pipes opening at the tank-wall, each pipe extending down through said perforated plate into one of said compartments, closed at its inner end and having perforations the length of said compartment, a float-controlled feeding-valve connecting the liquid-supply and the air-charged chambers, and a suction-pipe connecting the air-charged chamber opposite the air-inlets.

2. In an air-carbureter, a tank divided into an upper chamber for containing a hydrocarbon liquid and a lower chamber for containing the charged air, a perforated plate forming a bottom space, partitions whereby said space is formed into a plurality of longitudinal compartments of which said perforated plate forms a cover, air-inlet pipes, each pipe extending down through said perforated plate into one of said compartments and a pair of perforated pipes in each compartment connecting and extending as branch pipes from the end of each air-inlet pipe, a float-controlled feeding-valve connecting the liquid-supply and the air-charged chambers, and a pipe for delivering the charged air.

3. In an air-carbureter, a tank divided into an upper chamber for containing a hydrocarbon liquid and a lower chamber for containing the charged air, a perforated plate forming a bottom space within said lower chamber an air-inlet pipe entering said bottom space, and a perforated pipe connecting the end of said imperforated pipe and extending through said space beneath the perforated plate, means for feeding the liquid from the upper into the lower chamber and means for supplying gas from the lower chamber.

4. In an air-carbureter, a tank divided into an upper chamber for containing hydrocarbon and a lower chamber for containing the charged air, a perforated plate forming a bottom space in the lower chamber, a plurality of air-inlet pipes each comprising an imperforated branch opening at the tank-wall, and a pair of perforated branches extending within and through said bottom space, means for externally closing the air-inlets, means for controlling the supply of gas from said lower chamber and means for feeding liquid from the upper into the lower chamber.

5. In an air-carbureter, a tank forming a chamber for containing hydrocarbon and the charged air, a perforated plate forming a bottom space, partitions whereby said space is formed into a plurality of longitudinal compartments of which said perforated plate forms the cover, air-inlet pipes opening at the tank-wall, a pipe extending into and through each compartment, closed at its inner end and having perforations along the compartment, a suction-pipe connecting the air-charged chamber-wall opposite the air-inlets, and means for supplying said chamber with hydrocarbon.

In testimony whereof I have signed my name to this specification in the presence of two subscribing witnesses.

WILLIAM E. GARVEY.

Witnesses:
F. A. LEISENHEIMER,
HENRY PULLMAN.